March 9, 1954 K. B. GRODDECK 2,671,817
ELECTROACTIVE RADIATION SCREEN
Filed Nov. 18, 1949 2 Sheets-Sheet 2
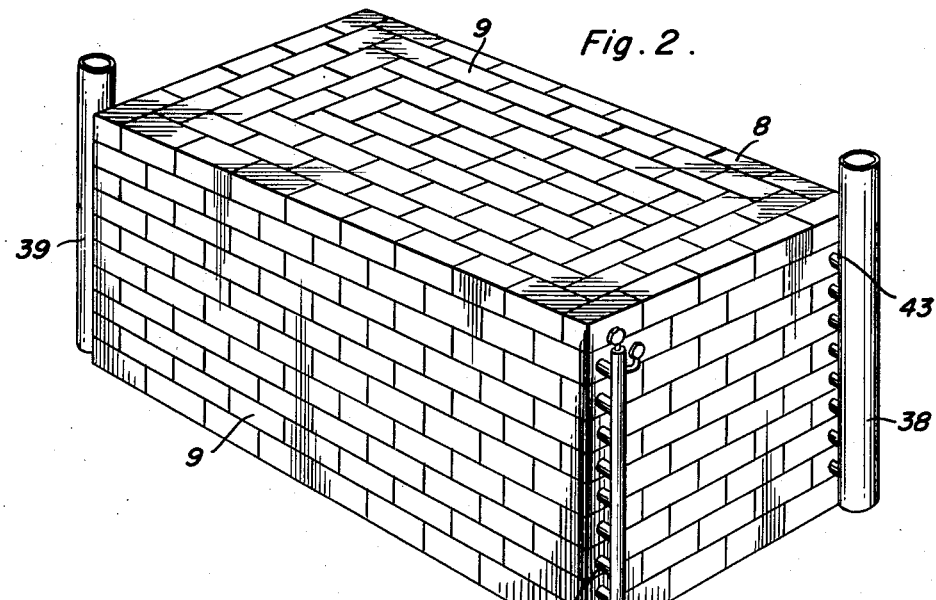
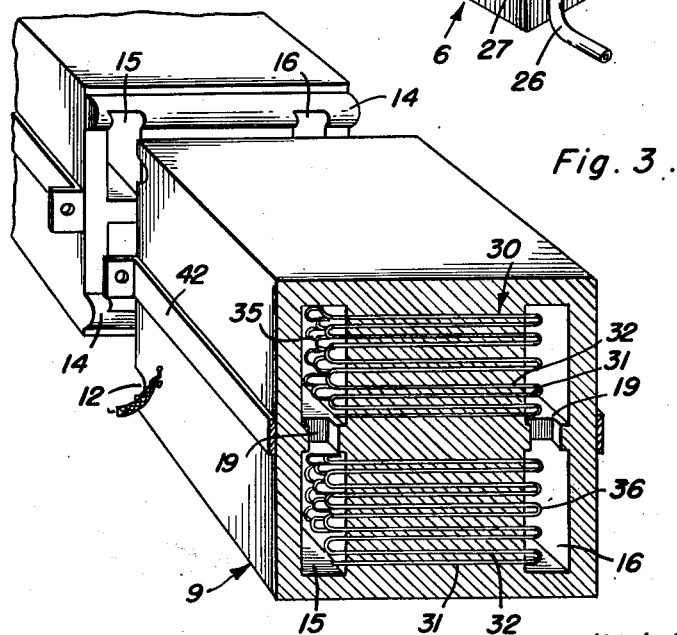
Inventor
Karl B. Groddeck Patented Mar. 9, 1954

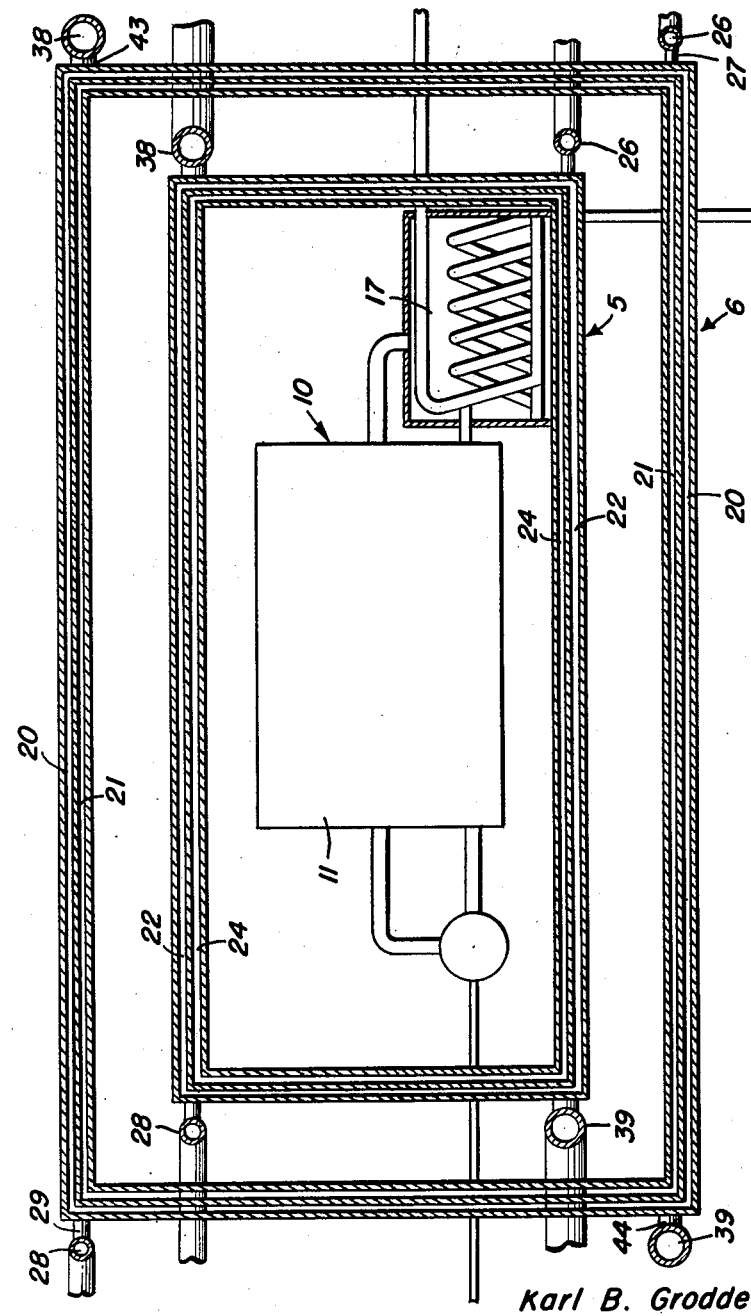

2,671,817

UNITED STATES PATENT OFFICE 2,671,817

ELECTROACTIVE RADIATION SCREEN

Karl B. Groddeck, New Orleans, La.

Application November 18, 1949, Serial No. 128,117

6 Claims. (Cl. 136—4)

1

This invention relates to radiation screens for atomic piles or breeders, for furnaces treating radio-active material and for other radiation emitting structures, and it has for its primary object to provide a screen performing a double function, combining with the function of protection the function of electricity generation.

A further primary object of the invention consists in providing a protective screen forming an electricity generating unit, which is completely separated from, unconnected with and independent of the power plant the radiation of which has to be intercepted.

A further object of the invention consists in providing a radiation screen having its own independent ventilation system which may be so regulated that a stable temperature behind the screen and also a stable temperature gradient within the screen is obtained.

A further object of the invention consists in providing a radiation screen having a double ventilation system, one system being arranged near its inner side and one system near its outer side, each system being provided with means for circulating a fluid, thus producing a predetermined temperature gradient within the screen structure.

A further object of the invention consists in providing a radiation screen of the type above described in which the circulating fluids flowing through the two ventilation systems are kept at different temperatures.

A further object of the invention consists in a radiation screen with two independent ventilating systems on the two sides of the screen, in which thermocouples form part of the screen and are embedded in the same and exposed to the temperatures prevailing at each side of the screen and maintained by means of the ventilating systems.

A still further object of the invention consists in providing a radiation screen provided with two ventilation systems, each consisting of a number of channels arranged near the outer and inner walls of the screen and further provided with thermocouples having their ends located in said channels so as to be exposed to the temperatures prevailing within said channels.

A still further object of the invention consists in providing a radiation screen of the kind above described in which the screen is formed of bricks of ceramic material each provided with two channels and each carrying, embedded within the ceramic material between the said channels, a number of thermocouples the ends of which are

2 projecting into the channels and are exposed to the fluid circulating within the channels and to the temperature prevailing within the same.

Further and more specific objects will be apparent from the following detailed specification.

The invention is illustrated in the accompanying drawing showing one embodiment thereof by way of example. It is however to be understood that the example shown in the drawing is a specific example selected in order to best illustrate the principle of the invention and one mode of applying said principle. The example shown is not intended to give a survey of the embodiments of the invention and modifications of the example shown are therefore not necessarily departures from the essence of the invention.

In the drawing:

Figure 1 is a diagrammatic sectional plan view through an atomic power plant surrounded by the screens according to the invention.

Figure 2 is a perspective view of one of the screens surrounding the atomic power plant.

Figure 3 is a sectional perspective view of the units or bricks forming the screen.

An atomic pile or breeder or a furnace producing radio-active materials and other radiation emitting plants must be shielded as well known, in order to intercept neutrons, beta and gamma rays emitted by the plant. Many constructions for such a shielding structure have been evolved. According to the invention shielding of the radiation emitting plant is obtained by means of a double screen, consisting of the two screens generally indicated at 5 and 6, each screen forming a complete unit separated from the other screen and from the pile. The pile or breeder is generally indicated at 10 and may be of any type, the invention being not connected with the type of pile or plant which is shielded. In the drawing an uranium pile 11 with a fluid circulation system 17, carrying off the heat generated in the pile, is shown by way of example.

Each of the screens 5 or 6 is formed by a brick structure 8 such as shown in Figure 2 which consists of bricks 9 of ceramic material, preferably made of porcelain. Such a brick is shown in detail in Figure 3. Those side faces of the brick which are joined to adjacent bricks are preferably provided with semi-cylindrical grooves and ledges 12, 14 exactly fitting into each other. The bricks are cemented by means of a refracting cement consisting of equal parts of so-called hot cement, fire clay and silicate of sodium.

Each brick is provided with a plurality of channels 15, 16 running in a longitudinal direction. Ribs 19 may intersect the channels and may either divide them completely or may only be of limited length so that communication between the channel sections is maintained. Each channel 15, 16 forms a passage for a heating or cooling fluid. When bricks 9 are joined to adjacent bricks within the structure the channels 15, 16 in each brick communicate with the channels of the adjoining bricks so that continuous channels 20, 21 in the outer screen and 22, 24 in the inner screen are formed as shown in Figure 1 in which figure however the size of the channel is exaggerated for the sake of clarity of the drawing.

Each channel 20, 21; 22, 24 runs around the screen and forms one of the circulation units of a complete circulation system which is formed by all the channels of the structure. In this system a fluid which is preferably air may circulate.

Each brick moreover contains a number of thermocouples 30 consisting of metal strips or ribbons 31, 32 embedded in the ceramic material or porcelain of the brick. The junction points 35, 36 at the end of the metal bars, strips or ribbons are located in the two channels 15, 16 respectively. A large number of thermocouples are placed side by side and relatively close to each other so as to form a row, and several rows may be placed one above the other as shown in Figure 3. The thermocouples form an effective part of the screen. For instance, 240 thermocouples may be placed into a brick, ten rows of twenty-four couples each. Flat metal strips or metal ribbons are preferably used in order to form the thermocouples, a shape which reduces the inner resistance of the couple and thus contributes to the efficiency of the same.

The channels 15 which are near the outside wall form a cooled fluid circulation channel. Cold air is introduced into said channel by means of an air distributing manifold 26 having as many outlets 27 as there are layers of bricks in the brick structure 5 or 6. By means of these manifold pipes air is blown through all the individual channels and is discharged at the other end through the short pipe sections 29 leading to a collecting manifold 28. Preferably the manifolds 26, 28 for the inner screen pass through the bottom layer of the structure to the outside.

Similarly, the channels 16 near the inner wall of the structure form a hot air circulation channel supplied with hot air by means of a manifold pipe 38 and discharged through the collecting manifold 39, the channels in each brick layer again forming a continuous circulation unit forming part of a system which comprises all the channels, each channel unit being connected with manifolds 38 and 39 by means of short connection pipes 43, 44.

It will thus be clear that two or more complete and independent circulation systems for hot and cooled air are formed in each screen structure 5 or 6, each system consisting of a large number of channels 20, 21, 22, 24 equal to the number of brick layers in the screen structure. The roof and bottom layers may either be connected with the circulation systems of the side walls or may form independent systems supplied by special manifolds similar to those shown.

The heating of the inner air channel is to a large part the result of radiation impinging on the inner wall of the screen. Therefore only a moderate heating of the air blown in is necessary to maintain the desired temperature. In many cases the air may even act as a cooling medium necessary to prevent a rise of a temperature beyond the tolerated limit. On the other side of the bricks the radiation has either been absorbed or has been materially reduced. The temperature in the outer channel will therefore be determined by that of the cooled air which is blown in.

In order to blow sufficient quantities of air through the system turbo ventilators, not shown, are preferably used driven by electric motors in the well known manner. The driving system may be under thermostatic control in order to maintain certain predetermined temperatures in the two ventilation systems.

As mentioned above the thermocouples 30 are so arranged that their central portion is embedded in the ceramic material while their ends protrude and project into the channels 15, 16. Preferably the soldered ends 36 are on the inside and project into the hot air channel while the outer ends at which the connections are made are located in the cooled air channel 15. All the connections are preferably made within the said outer channel. The connections within one brick may always be a series connection of the couples so that the voltage produced within an appropriate number of elements such as 240 elements for instance, will be of a suitable magnitude for operational purposes. Of course, the thermocouples of a number of bricks forming a group may be connected in series to secure a higher operational voltage if necessary, the groups being then connected in multiple.

The thermocouples of the outer screen are preferably made of copper and lead. However, also an alloy of bismuth and antimony may be used instead of lead for this purpose.

For the formation and the holding of the brick structure preferably elastic metal bandages 42 are used. If packing between the bricks is to be used heat insulating material such as asbestos or glass wool is preferable.

The thermocouples for the inner screen are preferably made of nickel and cadmium if it is not preferred to make the thermocouples of both screens of the same material in order to simplify the structure. In all other respects the inner screen as already mentioned is constructed exactly in the same way in which the outer screen has been constructed.

The temperature difference between the cooled air in channel 15 and the hot air in channel 16 should be approximately 200° C., the outer channel being preferably kept at room temperature of around 15° C. while the inner channel is supplied with hot air of a temperature which is so chosen that the temperature of the brick which is due to radiation will heat the hot air to the required temperature of 250° C. As already stated the temperature in the channels may be maintained by regulating the flow of air thermostatically.

It is seen that each radiation absorbing screen thus fulfills the double function of screen and electricity generator. While electricity generation through thermocouples is, as a rule, not economic under normal circumstances, as thermocouples produce electric energy only at a rate not exceeding 5 to 6% of the heat energy input, this rate can be somewhat raised in the present case because of the radiation received by the thermocouples and directly absorbed by one end of the said thermocouples. Moreover the heat acting on the thermocouples is waste heat produced by radiation and the structure may house an assembly which includes large numbers of thermocouples which contribute to the main function of the screen as they absorb radiation and also distribute and dissipate heat evenly throughout the structure. The construction of an electricity generating screen is therefore not only of advantage from the standpoint of reclaiming waste energy, but it also improves the function of the radiation screen as such.

The amperage of the current varies of course with the size of the plant but, as the necessary voltage can be built up either within a single brick or within a small number of bricks connected in series, the number of units or groups connected in multiple is always very large and therefore will furnish in most cases an amperage which may be directly applied to bus bars servicing certain auxiliary apparatus.

The radiation screen provided with two air channels has the great advantage that it carries its own ventilation system so that the screen may also be used for protective purposes, for instance for bomb shelters which are constructed in order to protect against radiation. The shape of the structure is always determined by the nature of the radiating plant to be provided with the screen. The screen may therefore either have the shape shown in Figure 2 which is rectangular in cross section or it may be half cylindrical or cylindrical or adopt other and more complicated shapes.

It will also be clear that the above description of a more or less specific example does not exclude changes in the details, especially of an unessential nature, which changes will not in any way affect the principle of the invention and this application as defined by the annexed claims.

Having described the invention, what is claimed as new is:

1. A screen for intercepting radiation emanating from a source of radio-active rays, comprising a wall structure enclosing said source completely, said wall structure consisting of brick units joined to each other, thermocouples embedded within said wall structure, having their joined ends turned toward the source of ray emission and their other ends on the side of the structure turned away from said source, each brick being provided with two channels near the outer walls of the brick, the ends of the thermocouples embedded within said wall structure, having their joined ends turned toward the source of ray emission and their other ends on the side of the structure turned away from said source the channels of each brick communicating with the channels of the adjacent bricks to which they are joined, all bricks in a layer thus forming part of a fluid conducting channel system, and means for circulating a fluid through each of said fluid conducting channel systems.

2. A screen for intercepting radiation emanating from a source of radio active rays comprising a roofed wall structure enclosing said source completely, said wall structure consisting of brick units of ceramic material joined to each other, each brick being provided with two channels near the outer walls of the bricks, the channels of each brick communicating with the channels of the adjacent brick to which they are joined, all bricks in a layer thus forming part of a fluid conducting system, thermocouples embedded in the said bricks of ceramic material, said bricks being so arranged that the joined ends of said thermocouples being located on the side of the wall structure turned toward the said source and the other ends of said thermocouples being located on the side of the wall structure turned away from said source, the ends of said thermocouples protruding into the said channels, and means for circulating a fluid through said fluid conducting channel systems.

3. A screen for intercepting radiation emanating from a source of radio-active rays comprising a roofed wall structure enclosing said source completely, said wall structure consisting of brick units of ceramic material joined to each other, each brick being provided with two channels near the outer walls of the bricks, the channels of each brick communicating with the channels of the adjacent brick to which they are joined, all bricks in a layer thus forming part of a fluid conducting system, thermocouples embedded in the said bricks of ceramic material with their soldered ends projecting into the channel near the inner wall of the structure and the connected ends projecting into the channel near the outer wall, the other sections of the thermocouples being embedded within the material between the two channels, series connections between said thermocouples located in the said outer channel and means for circulating a fluid through each of said fluid conducting channel systems.

4. A screen for intercepting radiation emanating from a source of radio-active rays comprising a roofed wall structure enclosing said source completely, said wall structure consisting of brick units of ceramic material joined to each other, each brick being provided with two channels near the outer walls of the bricks, the channels of each brick communicating with the channels of the adjacent brick to which they are joined, all bricks in a layer thus forming part of a fluid conducting system, thermocouples embedded in the said bricks of ceramic material with their soldered ends projecting into the channel near the inner wall of the structure and the connected ends projecting into the channel near the outer wall, the other sections of the thermocouples being embedded within the material between the two channels, series connections between said thermocouples located in the said outer channel, means for supplying the channel system formed by the brick channels located near the outer wall of the bricks with a cooling fluid, and means for supplying the channel system formed by the channels located near the main wall of the bricks with a heated fluid.

5. A screen for intercepting radiation emanating from a source of radio-active rays comprising a roofed wall structure enclosing said source completely, said wall structure consisting of brick units of ceramic material joined to each other, each brick being provided with two channels near the outer walls of the bricks, the channels of each brick communicating with the channels of the adjacent brick to which they are joined, all bricks in a layer thus forming part of a fluid conducting system, thermocouples embedded in the said bricks of ceramic material with their soldered ends projecting into the channel near the inner wall of the structure and the connected ends projecting into the channel near the the outer wall, the other sections of the thermocouples being embedded within the material between the two channels, series connections between said thermocouples located in the said outer channel, manifolds provided with a plurality of connections for supplying cooling fluid to the channel systems formed by the outer channel of the bricks, further manifolds with a plurality of connections for supplying a hot fluid to the inner channel systems formed by the channel of the bricks, and means for supplying said manifolds with cold and hot fluids respectively.

6. A screen for intercepting radiation emanating from a source of radio-active rays, comprising a plurality of roofed wall structures enclosing said source completely and one structure enclosing the other, each of said wall structures consisting of brick units of ceramic material, joined to each other, each brick being provided with two horizontally disposed channels arranged near the outer and inner walls of said brick, and each brick being provided with projecting and recessed portions on the faces joined to adjacent brick, the channels of all the bricks of one of the wall structures forming one horizontal layer communicating with each other and forming horizontal conduits, thermocouples embedded in the said bricks of ceramic material with their soldered ends projecting into the channel near the inner wall of the structure and the connected ends projecting into the channel near the outer wall, the other sections of the thermocouples being embedded within the material between the two channels, series connections between said thermocouples located in the said outer channel, separate means for each screen structure for supplying each of the horizontal conduits formed by the brick channels communicating with each other and located near the outer wall of the bricks with a cooling fluid, and means for separate means for each screen structure for collecting and discharging said fluid, said means including a supply and a discharge manifold for each screen, each provided with a number of connections equal to the number of conduits in a screen structure, separate means for each screen structure for supplying each of the horizontal conduits formed by the brick channels communicating with each other and located near the inner wall of the bricks with a heated fluid and separate means for each screen structure for collecting and discharging said fluid, said means including a further supply and discharge manifold, provided with a number of connections equal to the number of conduits in a screen structure.

KARL B. GRODDECK.

References Cited in the file of this patent

UNITED STATES PATENTS

| Number | Name | Date |
|---|---|---|
| 255,885 | Patterson | Apr. 4, 1882 |
| 781,289 | Marsh | Jan. 31, 1905 |
| 1,539,611 | Trowbridge | May 26, 1925 |
| 1,664,720 | Woodruff | Apr. 3, 1928 |
| 2,480,404 | Findley et al. | Aug. 30, 1949 |
| 2,519,785 | Okolicsanyi | Aug. 22, 1950 |
| 2,519,941 | Tama | Aug. 22, 1950 |

FOREIGN PATENTS

| Number | Country | Date |
|---|---|---|
| 618,508 | Great Britain | Feb. 23, 1949 |
| 233,011 | Switzerland | Oct. 2, 1944 |

OTHER REFERENCES

Goodman, "The Science and Engineering of Nuclear Power" vol. 1, pages 275, 320, 335, Addison Wesley (1947). (Copy in P. O. Library.)

Smyth, "Atomic Energy for Military Purposes," pp. 22, 103, 104, 177, August 1945. Copy may be purchased from Supt. of Documents, Washington 25, D. C.

Chem. Eng. News, vol. 23, pp. 2076, 2077, November 25, 1945. (Copy in Patent Office Library.)